US010057812B2

(12) United States Patent
Szilagyi et al.

(10) Patent No.: US 10,057,812 B2
(45) Date of Patent: Aug. 21, 2018

(54) METHOD AND APPARATUS TO IMPROVE TCP PERFORMANCE IN MOBILE NETWORKS

(75) Inventors: Peter Szilagyi, Debrecen (HU); Zoltan Vincze, Kormend (HU); Csaba Vulkan, Budapest (HU)

(73) Assignee: Nokia Siemens Networks Oy, Espoo (FI)

( * ) Notice: Subject to any disclaimer, the term of this patent is extended or adjusted under 35 U.S.C. 154(b) by 27 days.

(21) Appl. No.: 14/006,428

(22) PCT Filed: Mar. 21, 2011

(86) PCT No.: PCT/EP2011/054230
§ 371 (c)(1),
(2), (4) Date: Oct. 21, 2013

(87) PCT Pub. No.: WO2012/126509
PCT Pub. Date: Sep. 27, 2012

(65) Prior Publication Data
US 2014/0050095 A1    Feb. 20, 2014

(51) Int. Cl.
*H04W 28/02* (2009.01)
*H04W 28/12* (2009.01)
(Continued)

(52) U.S. Cl.
CPC ........... *H04W 28/12* (2013.01); *H04L 1/0002* (2013.01); *H04L 47/263* (2013.01);
(Continued)

(58) Field of Classification Search
CPC ..... H04W 28/08; H04W 24/00; H04W 28/04; H04W 80/00; H04W 76/02; H04W 80/06;
(Continued)

(56) References Cited

U.S. PATENT DOCUMENTS 6,208,620 B1 * 3/2001 Sen .................. H04L 1/1809
370/231
6,510,189 B1 * 1/2003 Hiramatsu ........... H04W 36/06
375/346

(Continued)

FOREIGN PATENT DOCUMENTS

CN          1260101 A      7/2000
CN         101080089 A    11/2007
(Continued)

OTHER PUBLICATIONS

Bakshi, B., et al., Improving Performance of TCP over Wireless Networks (1997), 9 pages.
(Continued)

*Primary Examiner* — Edan Orgad
*Assistant Examiner* — Ivan O Latorre
(74) *Attorney, Agent, or Firm* — Harrington & Smith

(57) ABSTRACT

The present invention provides a method, apparatus and a computer program product for improving TCP performance in mobile networks. The present invention discloses obtaining, at an intermediate network node, a quality measure of a connection between a content server and a user equipment, detecting, at the intermediate network node, whether the quality measure fulfils a predetermined condition, and, if the quality measure does not fulfill the predetermined condition, sending, by the intermediate network node, an acknowledgement message triggering a freeze mode of the connection between the content server and the user equipment.

21 Claims, 11 Drawing Sheets

(51) Int. Cl.
*H04L 1/00* (2006.01)
*H04L 12/825* (2013.01)
*H04W 80/06* (2009.01)
*H04L 1/18* (2006.01)
*H04L 29/06* (2006.01)

(52) U.S. Cl.
CPC ......... *H04W 28/0273* (2013.01); *H04L 1/187* (2013.01); *H04L 69/163* (2013.01); *H04W 28/0242* (2013.01); *H04W 80/06* (2013.01)

(58) Field of Classification Search
CPC ...... H04W 28/12; H04L 1/187; H04L 1/1607; H04L 1/1635; H04L 69/163; H04L 69/161; H04L 61/16; H04L 29/0818; H04L 45/245; H04L 1/0002; H04L 47/263; H04L 28/0242
USPC ....... 370/331–334, 329, 428, 236, 310, 229, 370/231, 345; 455/436–439, 70, 500, 455/517; 709/226, 201, 227, 249
See application file for complete search history.

(56) References Cited

U.S. PATENT DOCUMENTS

| | | | |
|---|---|---|---|
| 6,876,639 B1* | 4/2005 | Cao | H04L 1/1607 370/331 |
| 7,283,474 B1* | 10/2007 | Bergenwall | H04L 1/1832 370/235 |
| 7,418,249 B2* | 8/2008 | Matsumura | H04L 25/0262 375/225 |
| 8,498,632 B2* | 7/2013 | Astrom | G01S 5/021 455/418 |
| 2002/0106991 A1* | 8/2002 | Foore | H04W 28/08 455/70 |
| 2003/0022628 A1* | 1/2003 | Mamiya | H04L 1/16 455/67.11 |
| 2003/0086407 A1* | 5/2003 | Bhatt | H04L 1/0002 370/345 |
| 2003/0179720 A1* | 9/2003 | Cuny | H04L 47/14 370/310 |
| 2004/0255048 A1* | 12/2004 | Lev Ran et al. | 709/249 |
| 2008/0037420 A1* | 2/2008 | Tang | 370/229 |
| 2008/0225795 A1* | 9/2008 | Sun | H04L 1/187 370/331 |
| 2009/0168720 A1* | 7/2009 | Vinayakray-Jani | H04W 80/06 370/331 |
| 2010/0332664 A1* | 12/2010 | Yevmenkin et al. | 709/227 |
| 2011/0225285 A1* | 9/2011 | Patel | G06F 9/4856 709/224 |
| 2012/0057511 A1* | 3/2012 | Sivakumar et al. | 370/310 |
| 2012/0130938 A1* | 5/2012 | Tamano | H04W 24/06 706/52 |
| 2013/0111038 A1* | 5/2013 | Girard | 709/226 |

FOREIGN PATENT DOCUMENTS

| | | |
|---|---|---|
| JP | 2001/203697 A | 7/2001 |
| JP | 2006/025418 A | 1/2006 |
| JP | 2006/050228 A | 2/2006 |
| WO | WO 02056632 A1 | 7/2002 |
| WO | WO 2011/010462 * | 1/2011 ............ H04W 24/08 |

OTHER PUBLICATIONS

Jaehyung Lee, et al., "Freeze TCP+: RTT-based Congestion Control Algorithm in Heterogeneous Networks," Korean Society for Internet Information, vol. 9, No. 2 (2008), 5 pgs.

3GPP TS 23.401 V10.0.0 (Jun. 2010); 3rd Generation Partnership Project; Technical Specification Group Services and System Aspects; General Packet Radio Service (GPRS) enhancements for Evolved Universal Terrestrial Radio Access Network (E-UTRAN) access (Release 10), 261 pgs.

3GPP TS 36.413 V9.3.0 (Jun. 2010); 3rd Generation Partnership Project; Technical Specification Group Radio Access Network; Evolved Universal Terrestrial Radio Access Network (E-UTRAN); S1 Application Protocol (S1AP) (Release 9), 241 pgs.

3GPP TS 36.331 V9.3.0 (Jun. 2010); 3rd Generation Partnership Project; Technical Specification Group Radio Access Network; Evolved Universal Terrestrial Radio Access (E-UTRA); Radio Resource Control (RRC); Protocol specification (Release 9), 250 pgs.

Pacifico, D., et al., "Improving TCP Performance During the Intra LTE Handover", © 2009 IEEE Globecom, 8 pgs.

Elaarag, H., "Improving TCP Performance over Mobile Networks", ACM Computing Surveys, vol. 34, No. 3, Sep. 2002, 18 pgs.

So-In, C., et al., "PETS: Persistent TCP using Simple Freeze", 2009 First International Conference on Future Informatior Networks, Oct. 14-17, 2009, Beijing, China, 6 pgs.

Goff, T., et al., "Freeze-TCP: A true end-to-end TCP enhancement mechanism for mobile environments", IEEE Infocom 2000, Tel-Aviv, 26-30 Mar. 2000, 9 pgs.

Tian, Y., et al., "TCP in Wireless Environments: Problems and Solutions", © 2005 IEEE, IEEE Radio Communications, Mar. 2005, 6 pgs.

Bakshi, B., et al., Improving Performance of TCP over Wireless Networks (1997), 1 pg., Abstract only.

* cited by examiner

METHOD AND APPARATUS TO IMPROVE TCP PERFORMANCE IN MOBILE NETWORKS

FIELD OF THE INVENTION

The present invention relates to an improvement of TCP performance in mobile networks.

The radio access technology is evolving towards fully packet based, flat architectural solutions in order to improve system capacity, increase end-user data rates and reduce latency. The flat architecture and fully packet based technology is a cost efficient solution that further increases the competitiveness of the 3GPP technologies. The first evolutionary step is Internet—High Speed Packet Access (I-HSPA) that streamlines the evolutional path from 3G systems to Long Term Evolution (LTE). The aim of I-HSPA is to phase out parallel circuit switched infrastructure and to operate as packet switched only, decreasing complexity and cost. The high rate, fully packet based radio access solutions enable the migration of the packet services well known from the Internet to the mobile environment enabling mobile network users to access the applications provided by the Internet. Majority of these applications (e.g., file transfer, web browsing, etc.) use the Transmission Control Protocol (TCP) for reliable data transfer. Thus, the efficient handling of TCP based user plane traffic in I-HSPA/LTE network has high importance from system performance point of view.

In mobile environments, the requirement of efficient TCP operation raises several issues as originally the TCP was designed for wired networks where packet losses are caused by congestion. The probability of packet loss due to bit errors is extremely low. Thus, a packet loss is interpreted as a sign of congestion that triggers (in addition to retransmission) a TCP flow control action that reduces the rate of the flow. The TCP source considers a packet to be lost whenever its Retransmission Timeout (RTO) timer is expired or triple-duplicate acknowledgements (ACKs) are received for a sequence number lower than that of the packet in question. In wireless environments, packet losses are frequently caused by bit errors occurring on the air interface.

As the TCP source is not able to differentiate between the packet losses caused by bit errors and those caused by congestion, it will erroneously reduce the rate of the connection in case of bit errors too as there would be congestion. The fact that TCP was developed and optimized for transmission over wired links can become a serious issue whenever TCP based traffic is transmitted over wireless links. UMTS and LTE radio layer features such as Automatic Repeat-reQuest (ARQ) and Hybrid ARQ (HARQ) have been introduced in order to handle air interface errors via retransmission of the missing data. Although these features improve the overall performance, they might also increase the TCP Round Trip Time (RTT). Beside the improvements introduced by the ARQ and HARQ, TCP performance degradation still occurs in case of transient coverage problems; sudden increase of the TCP RTT due to forwarding of TCP segments over X2 (LTE) or Iur (I-HSPA) in case of handovers; TCP retransmissions caused by out of sequence delivery of data in case of handovers and network asymmetry (in LTE, it can happen that there is only DL coverage near cell edges). In these cases, the efficiency of data transfer is limited, the RTO timer of the TCP might expire, causing TCP slow start that will result in long recovery times (the recovery time is the time required to reach the throughput experienced before the problem occurred) for the TCP sources.

According to the present invention, a possible way to prevent the TCP performance degradation in these circumstances is to freeze the TCP sources whenever transmission problems are detected or predicted and resume the operation of the TCP when the system is able to operate efficiently again. This will minimize the probability of a TCP slow start caused by bad radio channel conditions or handovers and will allow TCP to continue with the same speed after the coverage problem or handover is over instead of the recovery through slow start. The solution is a useful alternative of terminating the service of the low priority connections via call drop or via starving whenever the need to serve the high priority connections requires drastic measures.

However, if the transmission problems last for a long time, some calls will have to be dropped eventually. Also, from a mobile subscriber's point of view, it is not realistic to assume that a frozen connection will be tolerated for an indefinitely long time without terminating the connection (i.e., manually cancelling a web page download). Nevertheless, TCP freeze can help prevent short-time transmission problems being escalated to the subscriber and thus our invention helps maintain a satisfactory quality of experience.

The present invention applies to LTE/I-HSPA radio access networks where users attached to the evolved Node Bs (eNB)/I-HSPA Base Transceiver Stations (BTS) have data connections (uplink or downlink) over TCP.

Further, the present invention also applies to Wideband Code Division Multiple Access (WCDMA)/HSPA radio access networks where users attached to the BTSs have data connections over TCP by using HSPA bearers.

Radio access network specific factors with negative impact on the TCP performance are for example, air interface errors, asymmetry, transient coverage problems such as a coverage hole, forwarding during handovers and transient air interface congestion. In the circumstance of these factors, the TCP source reduces its data rate followed by a relatively long recovery time after which the source is able to send with reasonable rate.

FIG. 1 shows the effects of the possible problems outlined above on a TCP flow. As a comparison, the figure also depicts what would happen if the flow was frozen at the state it had been before its performance has dropped and then, after the deteriorating conditions have been gone, the flow were to continue from this particular state. Without freezing, there is a long recovery time until the TCP flow can reach its original throughput again, with severely reduced performance in the meantime that provides practically unusable data rates for applications (in case of TCP timeouts, the throughput can even be dropped near to zero). On the other hand, in case of freezing the flow, there is a considerably shorter recovery time, thereby maintaining the responsiveness of TCP-based applications and thus the overall quality of experience offered for the mobile subscribers.

TCP performance degradation due to air interface errors is an inherent problem of TCP as its operation is based on the assumption of practically no bit errors on the transmission media. This is true in case of wired systems but not in case of wireless systems where the amount of packet drops due to transmission anomalies is high. The TCP source has no information about the reason of the detected packet drop, that is, it is not able to distinguish between packet losses due to congestion and transmission errors.

Regardless of the reason of the packet drop, the reaction of the TCP source is the same, i.e., the rate of the connection is reduced and the packet assumed to be lost is retransmitted. This is a good approach in case of transport network congestion but it is not efficient in case of air interface errors as the throughput of the source is unnecessarily reduced, which decreases the overall system performance and the quality of service experienced by the user.

The HARQ functionality located in the eNB or I-HSPA BTS (DL) or UE (UL) retransmits the missing data in case of air interface errors. In case the problem persists, the retransmission is repeated until the data is successfully transferred or the maximum amount of allowed retransmissions is reached. In the latter case, the ARQ functionality of the RLC located in the RNC, eNB or I-HSPA BTS (DL) or UE (UL) protocol takes care of the air interface error via a similar mechanism. At serious air interface problems, the maximum amount of the allowed RLC retransmissions is reached eventually and the data is discarded. This mechanism is efficient in handling the sporadic air interface problems but it might still cause TCP timeout as the retransmissions are increasing the RTT eventually leading to the expiry of the TCP RTO timer. A TCP timeout is always followed by a slow start, when the rate of the source is reduced drastically. In more fortunate cases, the increased RTT might only cause slightly reduced data rate.

In addition to sporadic air interface problems, there are still situations where packet losses occur due to poor radio conditions. For example, LTE users at the cell edge can suffer from the network asymmetry phenomenon, i.e., due to the higher transmission power of the eNB the user may have downlink connection but cannot send data in the uplink direction. Thus, the data received in downlink cannot be acknowledged by the receiver as acknowledgements would have to be sent in uplink; that will cause multiple consecutive timeouts. Besides the unnecessarily decreased throughput, this also raises the issue that due to the multiple timeouts and the exponential TCP back-off algorithm, long intervals (>1 min) may pass between the points in time when the TCP source attempts to retransmit the data at all. Accordingly, it can happen that the radio conditions recover just after an unsuccessful retransmission and the source will not be notified about it until the next retransmission takes place. In that way, the TCP flow will be idle for an unnecessarily long time. The same issues arise whenever there is a hole in the coverage area of the cell.

Packet loss on the air interface is not the only radio access specific problem with negative impact on the TCP performance. LTE and I-HSPA systems have distributed architecture with radio protocols terminated at the eNB or I-HSPA BTS that are responsible for handover decisions. In LTE, during handover (in LTE there is only hard handover) the source eNB forwards the DL packets via the X2 interface to the target eNB (or, in case of an S1 based handover, the forwarding is conducted through the S1 interface, resulting in usually longer forwarding path and transmission delay compared to X2 based handovers). UL data is sent by the target eNB to the SAE-GW via the S1 interface after the UE has been able to attach to the target eNB. Successful attach triggers path switch at the SAE-GW that might result in situations such as when for a given time the target eNB will receive packets destined to the UE both via S1 (from the SAE-GW) and via X2 (from the source eNB) interfaces.

The packets forwarded over the X2 interface traverses a different and probably longer path than those sent directly to the target eNB via the S1 interface. Congestion can occur on both interfaces. These mechanisms, i.e., X2 forwarding and late path switching can cause two problems from the perspective of TCP performance: first, the TCP source might transit into slow start due to sudden increase of delay (as the forwarded packets may traverse a longer path, there is a chance that due to the sudden increase of the RTT, the RTO timer of the TCP source will expire causing slow start); second, it might cause unnecessary retransmissions due to out of order delivery of the TCP packets to the destination (when the delay on the X2 interface connecting the source and target eNB is higher than the delay on the S1 interface connecting the SAE-GW and the target eNB, the packets sent after path switch over the S1 interface may be received before the forwarded packets over the X2 interface resulting in out of order transmission and duplicate ACKs that will, misleadingly, indicate packet loss to the TCP source). In order to avoid the latter problem, a special "end marker" GTP packet was introduced in LTE systems. The SAE-GW sends the end marker GTP packet to the source eNB before path switch. This packet contains no user data by itself; its sole purpose is to explicitly indicate that the source eNB would not forward any more GTP packets containing user data.

Consequently, the target eNB will not send the packets received over the S1 interface to the UE until the end marker has been received on the X2 interface. However, the end marker packet may be lost in the transport network that would prevent the target eNB from sending any traffic to the user. To avoid this, an end marker timer is implemented in the target eNB and if the end marker packet is not received before the expiration of the timer then the target eNB will anyway start to send the packets received on the S1 interface to the user. The improper setting of the end marker timer can result in situations where the TCP source will erroneously detect packet loss. If the timer is set to a too high value then the loss of the end marker packet will delay the new packets received on the S1 interface for a long time interval, triggering the expiration of the TCP RTO timer. If the timer is set to a too low value, then it may happen that due to high X2 delay, the end marker timer expires before the last forwarded packet is received and that would cause out-of-order delivery triggering duplicate ACKs.

In I-HSPA systems, during handover, both the UL and DL traffic is forwarded over the Iur interface between the involved I-HSPA BTSs. With the forwarding in place, the path of the traffic suddenly increases, that will cause sudden increase of the delay with the possibility of the RTO timer expiry and TCP source entering slow start.

As described above, in both LTE and I-HSPA systems, the forwarding during handover causes performance problems and additional load that the capacity-limited last mile links have to carry. A good solution to these problems, according to the present invention, is to freeze the TCP connections at the beginning of the handover and resume their operation after the handover is completed.

Due to the mobility of the users, the traffic demand to be served by an eNB or WCDMA/HSPA/I-HSPA BTS is changing continuously over time. Thus, there can be cases when, in order to serve a higher priority user, the throughput of lower priority users has to be decreased or some of them have to be dropped entirely. Even if the increased traffic demand holds only for a short while (i.e., some users leave the eNB or terminate their connection), the throughput of lower priority TCP connections will drop significantly and the original throughput of the affected connections will be reached after a relatively long recovery time. In other cases, transient air interface congestion might occur when the serving of the high priority traffic is problematic. In these cases, the freeze-resume mechanism would result in a better operation as it allows shorter recovery of the connections and prevents the TCP slow starts.

In mobile networks, the air interface may not be the only wireless link in the E2E path of the TCP connection as BTSs are often connected to the wired mobile backhaul via microwave radio links. The Bit Error Rate (BER) of microwave links is considered to be similar to that of wired links in most of the operational time, utilizing error detection and correction mechanisms similar to those used in case of LTE or WCDMA air interfaces. BER might suddenly increase for short time intervals due to unfavourable changes in the radio conditions (e.g., fading, interference, etc.), that causes decreased microwave link capacity as a more redundant coding and modulation scheme is selected when air interface errors are detected. These sudden changes can degrade the throughput of TCP connections significantly. In addition to the changing capacity of the microwave links, transient congestion on transport links (especially on capacity limited last mile links) might cause QoS degradation.

The present invention proposes a solution that freezes the TCP connections whenever air interface coverage problems, transient air interface or transport congestions are detected or predicted, when a handover decision is made by the system or when prioritization of higher priority users over lower priority users is required in order to secure the right level of service. The TCP flows selected to be frozen are allowed to resume after the system sees the possibility of safe operation.

BACKGROUND OF THE INVENTION

TCP performance issues in wireless networks have been studied in many papers. Documents [3] and [2] provide overview proposals for improving TCP performance in wireless mobile networks.

Another TCP freeze principle was introduced also by document [1]. The authors of that paper proposed to "freeze" the TCP source for the duration of a handover by making the TCP receiver in the UE send a TCP ACK with 0 advertised window size (Zero Window Advertisement—ZWA) when the UE expects a handover to happen. The ZWA forces the TCP source to freeze all retransmit-timers and enter persist-mode. Upon finishing the handover, the TCP receiver in the UE sends triple ACKs with positive window size to make the source leave persist-mode and continue sending segments using the same RTO timer value and congestion window size used before the persist-mode operation.

Although both the solution proposed by document [1] and the one according to the present invention as described below uses the TCP freeze principle, there is a major difference between them regarding the placement of the functionality being responsible for sending the ZWA as document [1] proposes to implement it in the UE while, according to the present invention, it is proposed to implement it in the radio access nodes. The drawback of having the freeze functionality in the UE is that the UE has only limited information about the mobile network, thus it cannot properly predict handovers and network coverage holes and it is not able to handle issues caused by short term prioritization and degraded radio conditions of wireless transport network links.

Also, it requires the UE to implement a cross-layer functionality between the TCP layer of the application protocol stack and the RRC layer. Moreover, this solution cannot be influenced directly by the mobile network operator.

Therefore, the TCP freeze mechanism implemented in radio network nodes according to the present invention has an advantage with respect to the one implemented in UEs as it can provide a wider range and more accurate freeze triggers and it is transparent to the UE, with no standardization and implementation impact on UE manufacturers.

Document [6] proposes a solution that combines the TCP freeze principle and Mobile IP in the persistent TCP using Simple Freeze (PETS) framework for preventing TCP from disconnecting in mobile networks. The framework uses ICMP messages for monitoring link states and detecting link failures, upon which TCP flows are frozen by ZWAs for the duration of the failures. Thus, the termination of TCP connections can be avoided by PETS.

However, this solution cannot tackle the issues solved by the present invention (spurious timeouts due to increased RTT and packet losses in bad channel conditions, etc.) as the ICMP based link state detection is not suitable for that purpose. Also, the present invention does not depend on defining new ICMP messages for its operation.

An approach similar to the TCP freeze principle is used by a solution proposed by document [4]. In this solution, the BTS sends an explicit feedback on the bad state of wireless link to the TCP source residing in the fixed network to reset all timeout timers. For this purpose, document [4] proposes to implement an Explicit Bad State Notification (EBSN) ICMP message. However, the EBSN mechanism according to document [4] requires the implementation of a new ICMP message while the solution according to the present invention does not require the definition and implementation of new message types of any kind. Moreover, the EBSN requires extended TCP functionality, which limits the usability of the solution proposed in document [4]. The solution according to the present invention requires no additional TCP functionality; its operation is transparent to the TCP layer.

A different approach than the TCP freeze principle is used by document [5] to avoid spurious TCP timeouts during handovers in LTE networks. Instead of freezing TCP sources, the two methods proposed by the authors are based on the idea of decreasing the amount of forwarded packets.

Contrary to the solution according to the present invention, both methods require the modification of the standardized handover message sequence (TS 23.401, TS.36.413) as the path switch is done earlier than the reception of the handover confirm message in the target eNB. Additional drawback of these solutions is that carrying out the path switch before the handover is confirmed introduces the risk of inconsistent system state upon unsuccessful handover. As TCP traffic is not stopped in case of handover and limited radio conditions, the effect of packet losses not related to congestion cannot be mitigated by these solutions.

PRIOR ART DOCUMENTS:

[1]—T. Goff, J. Moronski, D. S. Phatak, and V. Gupta, "Freeze-TCP: A true end-to-end TCP enhancement mechanism for mobile environments", In proc. of IEEE Infocom 2000, Tel-Aviv, pp. 1537-1545, 26-30. Mar. 2000.

[2]—H. Elaraag, "Improving TCP Performance over Mobile Networks," *ACM Computing Surveys*, vol. 34, no. 3, September 2002, pp. 357-374.

[3]—Y. Tian, K. Xu, and N. Ansari, "TCP in Wireless Environments: Problems and Solutions," *IEEE Radio Communications*, vol. 43, no. 3, March 2005, pp. S27-S32.

[4]—B. Bakhsi, P. Khrisna, N. H. Vaidya, and D. K. Pradhan, "Improving of TCP over wireless networks," In proc.

of 17th *International Conference on Distributed Computing Systems,* 1997, pp. 365-373.

[5]—D. Pacifico, M. Pacifico, C. Fischione, H. Hjalrmasson and K. H. Johansson, "Improving TCP Performance During the Intra LTE Handover", In proc. of IEEE Globecom 2009, Honolulu, pp. 1-8, Nov. 30-Dec. 4 2009.

[6]—C. So-In, R. Jain, G. Dommety, "PETS: Persistent TCP using Simple Freeze", In proc. of First International Conference on Future Networks, Beijing, China, pp. 97-102., 14-17. October 2009.

SUMMARY OF THE INVENTION

According to the present invention, there are provided a method, apparatus and a computer program product for improving TCP performance in mobile networks.

According to an aspect of the invention there is provided a method comprising:

obtaining, at an intermediate network node, a quality measure of a connection between a content server and a user equipment;

detecting, at the intermediate network node, whether the quality measure fulfils a predetermined condition, if the quality measure does not fulfill the predetermined condition, sending, by the intermediate network node, an acknowledgement message triggering a freeze mode of the connection between the content server and the user equipment.

According to further refinements of the invention as defined under the above aspects the connection between the content server and the user equipment is a downlink for downloading content from the server to the user equipment and the acknowledgment message is sent to the content server;

the connection between the content server and the user equipment is an uplink for uploading content from the user equipment to the server and the acknowledgment message is sent to the user equipment;

detecting includes predicting, at the intermediate network node, whether the quality measure will fulfill a predetermined condition within an upcoming predetermined time period, based on the obtained quality measure;

the method further comprises detecting, at the intermediate network node, after the connection is frozen, whether the quality measure fulfils the predetermined condition, and if the quality measure fulfills the predetermined condition, sending another acknowledgement message to the content server or the user equipment triggering a defreeze mode of the connection;

the method further comprises sending another acknowledgement message to the content server or the user equipment triggering a defreeze mode of the connection after a lapse of a predetermined time period;

the quality measure relates to radio channel quality, overall load of a cell, air interface coverage, transient air interface or transport congestions, or a handover decision or prioritization of higher priority users.

the connection is a transmission control protocol, TCP, connection;

the intermediate network node is a radio access node.

According to another aspect of the present invention there is provided an apparatus, comprising:

an obtaining unit configured to obtain a quality measure of a connection between a content server and a user equipment;

a detecting unit configured to detect, whether the quality measure fulfils a predetermined condition, a freezing unit configured to compose, if the quality measure does not fulfill the predetermined condition, an acknowledgement message for triggering a freeze mode of the connection between the content server and the user equipment, and a transceiver configured to forward the acknowledgement message.

According to further refinements of the invention as defined under the above aspects, the connection between the content server and the user equipment is a downlink for downloading content from the server to the user equipment and the acknowledgement message is forwarded to the content server;

the connection between the content server and the user equipment is an uplink for uploading content from the user equipment to the server and the acknowledgement message is forwarded to the user equipment;

the detecting unit is further configured to predict, based on the obtained quality measure, whether the quality measure will fulfill a predetermined condition within an upcoming predetermined time period;

the detecting unit is further configured to detect, after the connection is frozen, whether the quality measure fulfils the predetermined condition, and if the quality measure fulfills the predetermined condition, the freezing unit is configured to compose another acknowledgement message for triggering a defreeze mode of the connection;

the freezing unit is further configured to compose another acknowledgement message for triggering a defreeze mode of the connection after a lapse of a predetermined time period;

the quality measure relates to radio channel quality, overall load of a cell, air interface coverage, transient air interface or transport congestions, or a handover decision or prioritization of higher priority users;

the connection is a transmission control protocol, TCP, connection.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to further refinements of the invention as defined under the above aspects, the processing device is a radio access node.

With respect to the above and the following description of embodiments of the invention, it is noted that the terms "means" and "units" as used in the description and Figures have the same meaning and are thus interchangeable.

BRIEF DESCRIPTION OF THE DRAWINGS

These and other objects, features, details and advantages will become more apparent from the following detailed description of embodiments of the present invention which is to be taken in conjunction with the appended drawings, in which.

DETAILED DESCRIPTION

Figure 1:
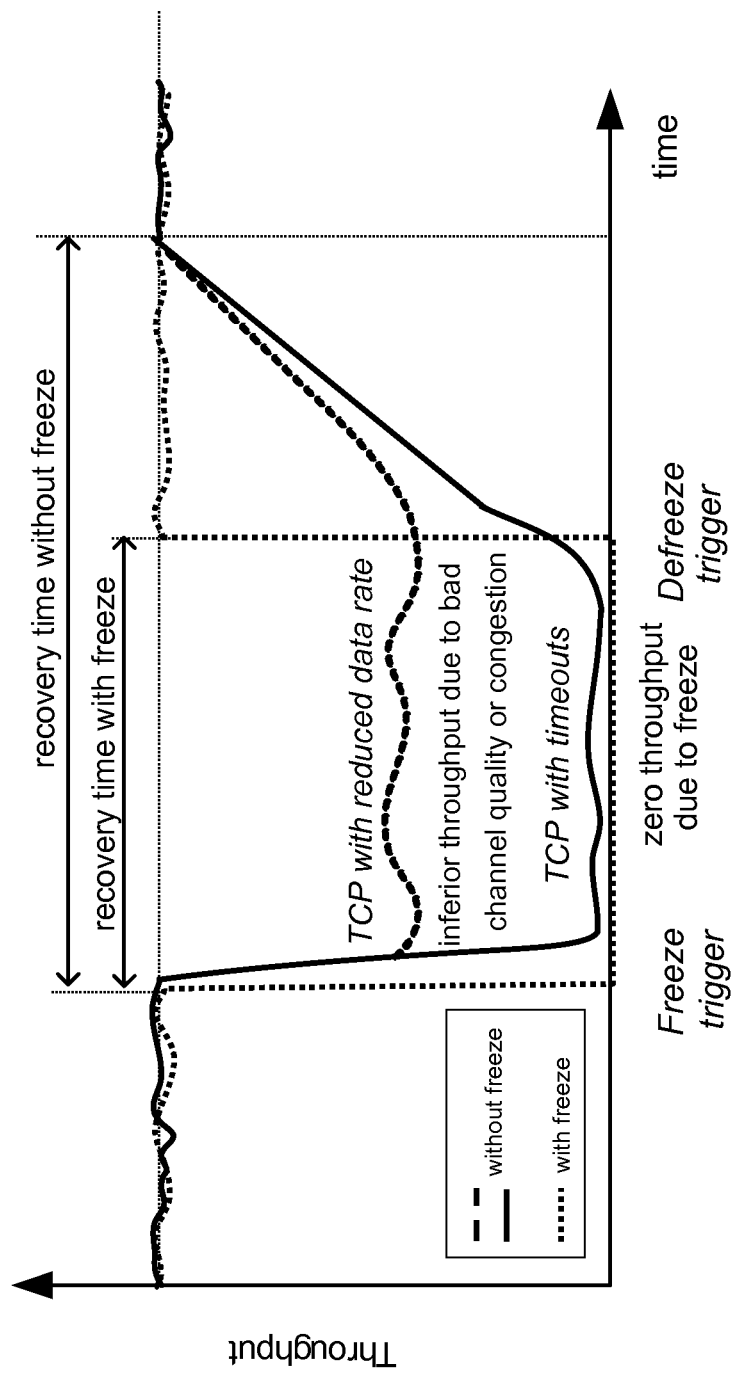
FIG. 1 is a diagram illustrating the performance of a TCP flow according to an embodiment of the present invention.

In the following, embodiments of the present invention are described by referring to general and specific examples of the embodiments. It is to be understood, however, that the description is given by way of example only, and that the described embodiments are by no means to be understood as limiting the present invention thereto.

According to an embodiment of the present invention, there is proposed a solution that differs from the prior art in that it introduces a functionality located at the radio access nodes (eNB, I-HSPA BTS, SAE-GW, RNC) that follows the status (radio channel quality, transport congestion, handover, etc.) of the user plane connections, the overall load of a cell or any other relevant quality measure and freezes the selected TCP connections using regular ACK messages, i.e., the solution according to the embodiment of the invention does not require the use of dedicated ICMP or other commands in order to freeze the TCP sources. Accordingly, the proposed functionality is transparent to the TCP layer and no additional functionality is needed at the TCP source or receiver side.

The scope of the proposed functionality, referred to as freeze agent (FA) hereafter, is to detect and/or predict the cases when a given TCP flow might experience performance degradation due to radio coverage problems, transport congestion or handovers and to freeze the TCP flow in order to prevent the performance degradation. The data transfer of the TCP flow is resumed after the transient radio coverage problem is over or when the late path switching is performed (in case of handovers). Intransit TCP data packets are forwarded by the system according to the regular operation. Additionally, the FA is used whenever serving the high priority connections with the proper QoS would require that low priority connections are dropped or the prioritization would bring serious performance degradation to the low priority connections.

According to the present invention, it is possible to react to transient disturbances or short term interruptions of the network services (such as time spent between detaching from the serving eNB and successfully attaching to the target eNB during LTE handovers) that are over within a few seconds. In these cases, the freezing mechanism provides an improved QoS as opposed to the current situation when connections exposed to deteriorated channel quality might experience poor level of service, can be dropped by the system or even terminated by the subscribers due to poor end user experience. After the TCP freeze, the functionally continues to monitor the relevant quality measures in order to find the optimal time when the freeze can be terminated and data transfer can be resumed. At handovers, this measure is the Path Switch Request Ack message sent by the MME to the target eNB (after the SAE-GW has completed the necessary bearer modification for the downlink path switch) or the successful attach to the target eNB. When the freeze was triggered by transport quality degradation (increase delay and/or packet drop, decreased throughput, high load, connectivity problems, etc.) or by increased cell load, the functionality keeps collecting and evaluating the relevant measurements in order to detect the suitable time for defreeze.

In a similar way, if a TCP flow has been frozen due to radio coverage problems in an LTE system, the FA needs to have means to detect the time when the problem is ceased and the connection can safely be resumed. If not all flows of a UE have been frozen (e.g., there are VoIP or other non-TCP based flows as well), the eNB can collect information on the quality of the radio link from the CQI reports corresponding to the non-frozen flows of said UE; that provides the possibility to evaluate if the quality becomes good enough for resuming the frozen connections. If all flows have been frozen, the UE still monitors the cell specific reference symbols' receive power (RSRP). These reference symbols are sent in standardized resource elements in all cells (i.e., the time-frequency schedule of these symbols are known) and thus each UE can have a good estimate of the quality of its radio link even if it has not been scheduled by the eNB at all. If the UE detects by receiving normal RSRP that its radio link has been recovered, it sends a Scheduling Request (SR) RRC message on the SRBO signalling bearer, which is mapped to the Random Access Channel (RACH), allowing the UE to send notification to the eNB without having a scheduling grant previously issued by the eNB. The RRM entity of the eNB receives the SR message and it notifies the FA about the recovery, indicating the identity of the UE.

In any case, a guard timer is implemented that forcibly resumes a connection if it has been frozen for a specific time in order to avoid connections stuck frozen for an unduly long time due to failure of noticing that the conditions for keeping a connection frozen hold no more. This timer should be started for each connection, regardless of the initial trigger that resulted in the freezing decision. Alternatively, the timer may be set to different values based on the type of the trigger (i.e., the guard timer may be set lower for a handover triggered freeze than for a coverage hole triggered freeze, because handovers are controlled events with a reasonable time constraint, whereas it cannot be known in advance how long the UE would be in an area with insufficient coverage). If the trigger for freezing some flows is prioritization of others for a specific time interval that is known in advance, the guard timer can be set to (or a bit higher than) this planned time interval.

As discussed above, the detection and prediction requires that the FA collects relevant radio network measurements (e.g., RRC Event A3 measurements), transport network management information (e.g., MWR link conditions), traffic management information (e.g., QCI or SPI of the connection) and handover management information (e.g., HO decisions). Based on these pieces of information, the relevant events (those that can lead to performance degradation, e.g., handover, degraded radio conditions, etc.) can be detected or predictions can be made. These events are referred to as freeze triggers hereafter.

Figure 2:
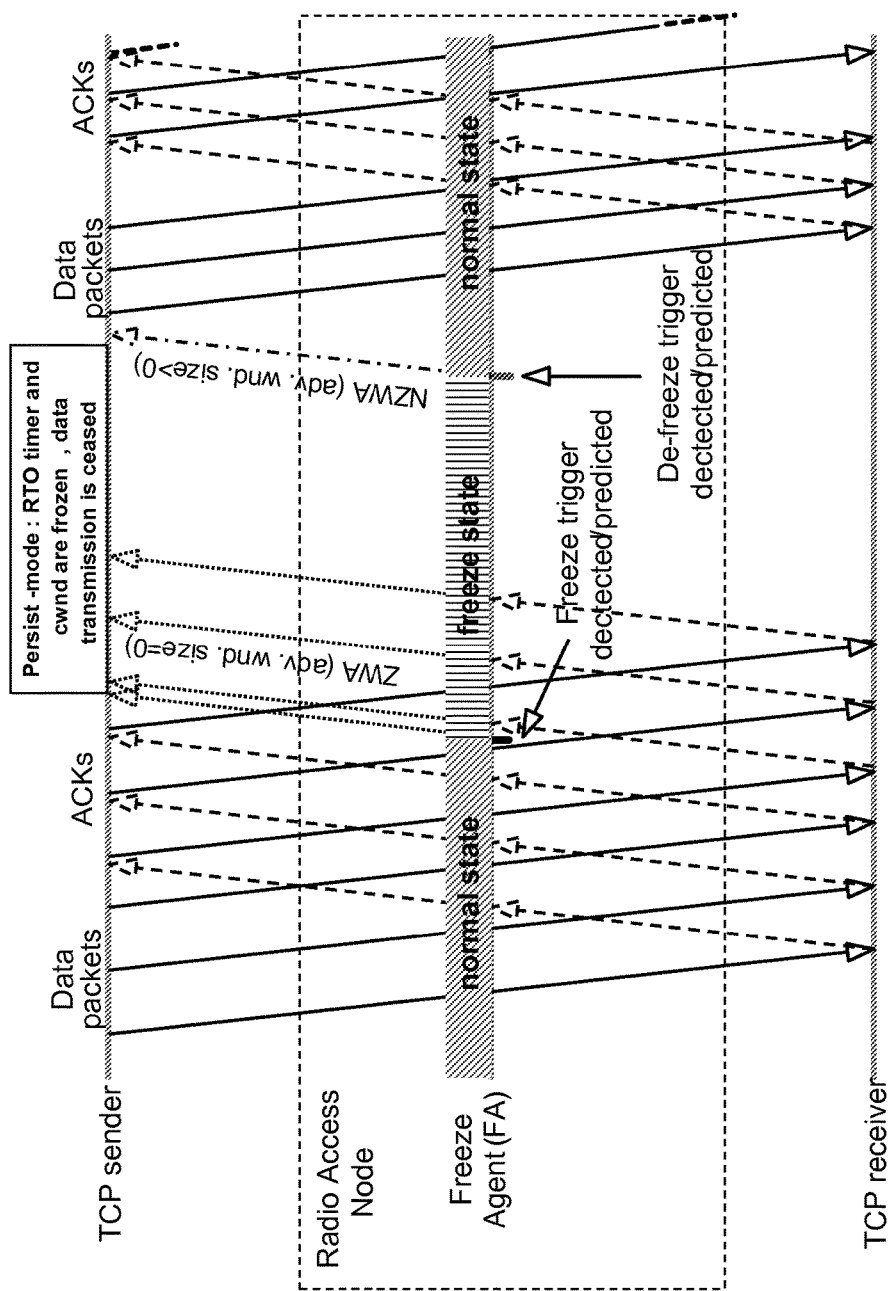
FIG. 2 is a diagram illustrating an operation of a freeze agent according to an embodiment of the present invention.

From the perspective of the FA, a connection is either in freeze state (in case the FA detected a freeze trigger and took the appropriate action) or in normal state. The FA has a dedicated register for each connection into which it copies the last ACK that traversed the node. This operation is transparent to the connections as in normal state each TCP ACK is received, copied into the FA registers and forwarded unchanged by the system. Whenever a freeze trigger is received (e.g., generated by a handover event), the FA sets the related TCP connection into freeze state in order to avoid the possible performance degradation by forcing the source into persist-mode while the event exists. Upon setting the freeze state for a connection, the functionality re-sends the stored ACK of the connection with zero advertised window size (ZWA) on behalf of the TCP receiver (FIG. 2).

Upon the reception of the ZWA, the TCP source enters in persist-mode, it freezes the RTO timer and the congestion window size and it stops sending new data. Meanwhile, further ACKs sent by the receiver as a response to packets sent by the source before it has received the ZWA are copied in the FA registers (the content of the register is updated after a new ACK is detected by replacing the stored ACK with the new one) and sent with modified content (with advertised window set to zero). While the connection is in freeze state, the FA keeps monitoring the relevant measures in order to decide if the freeze state should be maintained or terminated. If the circumstances that have triggered the freeze state no longer exist (i.e., when the coverage problem is over or the late path switching was successful), it is taken as a defreeze trigger that causes the transition of the connection to normal state.

Upon switching back to normal state, the FA sends the stored TCP ACK with non-zero advertised window size (NZWA) on behalf of the receiver. This will make the TCP source to leave persist-mode and start transmitting new data. TCP sources being in persist-mode during the time spent between the reception of the ZWA and NZWA are not affected by the possible packet losses and increased delays. Accordingly their rate is not reduced unnecessarily and thus the recovery after defreeze will be faster. Consecutive ACKs are forwarded unchanged to the source by the FA. In case the ACK containing the ZWA is lost, the receiver will continue to send ACKs as a response to the received data packets. These ACKs are captured by the FA and sent with modified content (i.e., zero advertised window), eventually being able to force the source into persist mode. Additionally, the FA should monitor the data packets in order to observe if the source has resumed the data transfer. In case there is no traffic, the ACK with NZWA is resent after a protection timer is over.

The FA can be implemented in each or in selected set of the eNBs/I-HSPA BTSs/RNCs and/or in all or in a selected set of the SAE-GWs/GGSNs of an LTE/I-HSPA/WCDMA system and it may handle uplink and/or downlink TCP connections. It is up to the operator's policy if the functionality handles all or only a subset of the TCP connections traversing the node(s) in which the functionality is implemented. For example, the operator may provide this feature only for premium users. The nodes that have FA implemented (turned on) must communicate with each other for proper operation (e.g., in case of handover between eNBs/I-HSPA BTSs with FA functionality, the ZWA is sent by the source eNB/I-HSPA BTS while the NZWA is to be sent by target eNB/I-HSPA. However, the ACK is stored by the source eNB/I-HSPA BTS, i.e., the relevant information must be available at the target eNB/I-HSPA BTS). Communication between nodes implementing FA is also required for enhanced freeze trigger detection and prediction.

The possible events or conditions resulting in a freeze trigger include but are not limited to the following ones:
(1) Short term prioritization of designated flows: non-prioritized TCP connections are frozen for the interval of the prioritization instead of its packets being dropped/delayed or the entire connection being dropped;
(2) Handover: if handover of a UE is predicted or detected then the TCP connections belonging to it are frozen until the end of the handover;
(3) Poor radio coverage: in case poor uplink/downlink radio conditions are detected or predicted for a UE its TCP connections are frozen until the radio conditions have recovered;
(4) Degradation of microwave link radio conditions: all or part of the TCP connections going through a BTS are frozen while its microwave link suffers from increased BER and/or decreased link capacity;
(5) Congestion on transport links: the load can be temporarily decreased by forcing the too low priority connections into freeze.

A valid implementation consists of users having data calls over LTE, I-HSPA or WCDMA/HSPA systems, a SAE-GW, I-HSPA GW (GGSN) or RNC and an eNB, I-HSPA BTS or WCDMA BTS.

A freeze agent (FA) can be a software component running on or attached to LTE eNBs/I-HSPA BTSs that are connected to the SAE-GW/GGSN via the S1-U/Gn-U interface, whereas neighbouring eNBs/I-HSPA BTSs are connected via the X2/Iur interface. The FA collects relevant radio network measurements (e.g., RRC Event A3 measurements), transport network management information (e.g., MWR link status), transport network measurements (e.g., one way delay, RTT, packet drop ratio, throughput, load), traffic management information (e.g., QCI of the connection, operator policies, etc.) and handover management information (e.g., HO decisions). This information is used in order to detect and/or predict events that are freeze or defreeze triggers. There are events that can be only detected: coverage hole, link outage, etc. In these cases the actions taken by the FA are reactive.

Other events can be detected and/or predicted: handovers, radio channel degradation, congestion etc. In these cases the actions taken by the FA are pro-active whereas in the former cases the actions of the FA are reactive. In parallel with the prediction (handovers, radio channel degradation, congestion, etc.) and/or detection (i.e., coverage hole, link outage, handovers, radio channel degradation, congestion, etc.) of given events, the FA management entity monitors the TCP traffic and stores the latest ACKs transiting the eNB/I-HSPA BTS in the ACK register. There is a separate register maintained for each connection. Radio measurements are used in order to detect or predict coverage problems and to predict handovers, etc.; transport network management information is used in order to detect transient degradation of the MWR links; transport network management information and measurements can be used in order to detect/predict quality degradation on the transport network (this is, however, limited to the cases when the information on the transport network status or the load on the transport links is available without significant latency thus transient problems can be efficiently detected and handled by the FA); handover decisions are used in order to detect that a given user is having handover, whereas the traffic management information is required in order to perform short term prioritization among users, which is out of the scope of long term subscription grade based prioritization through scheduling mechanisms.

Figure 3:
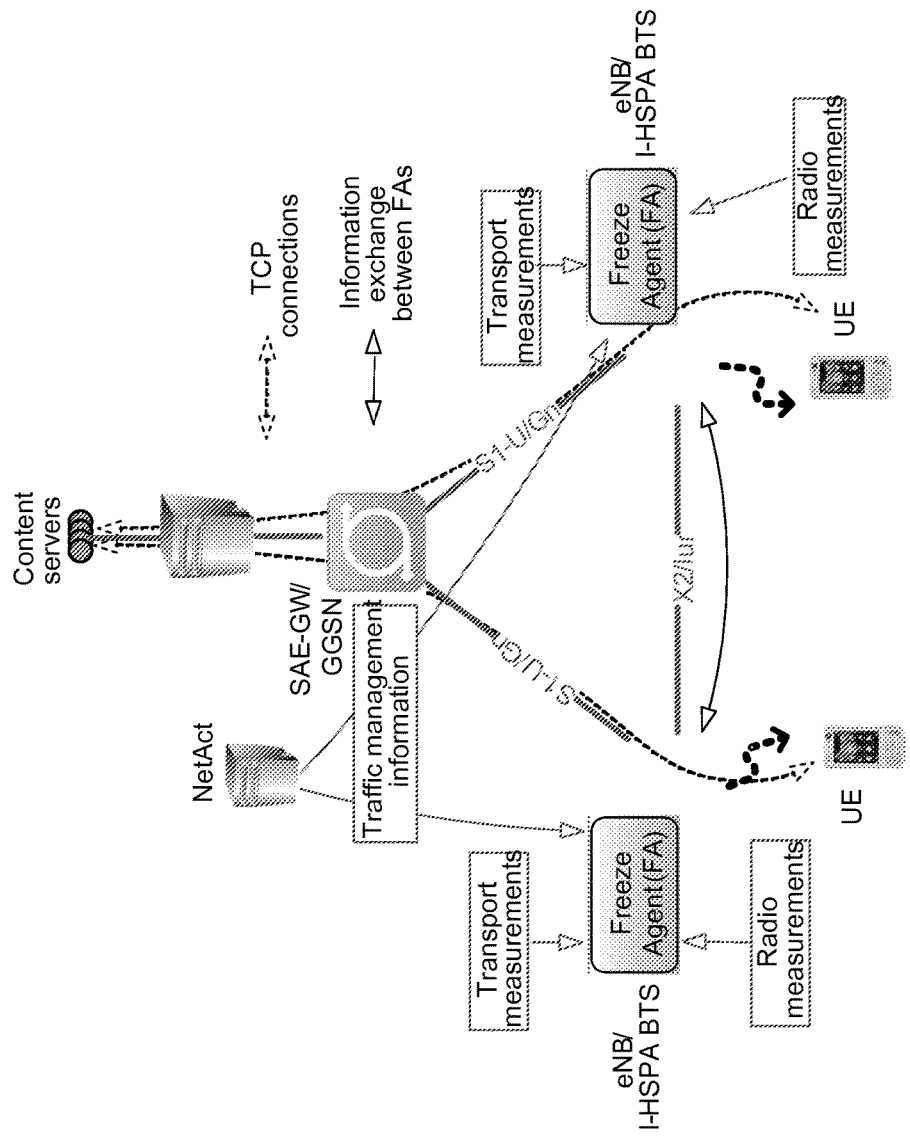
FIG. 3 is a diagram illustrating a system architecture is case of a eNB/I-HSPA BTS resident freeze agent according to an embodiment of the present invention.

Related policies can be defined per QCI (LTE) or SPI (I-HSPA) system-wide and downloaded from the network management database (NetAct) to each eNB/I-HSPA BTS capable of participating in a freeze action. Additionally, an option could be provided for locally overriding the system-wide policies on eNB/I-HSPA BTS level. The policies might include the triggers that are to be applied to a given connection. In case handover related triggers are configured for a particular QCI/SPI or for a given connection, the FAs of the involved eNBs/I-HSPA BTSs should be able to exchange the relevant information over the X2/Iur interface. The format of the information might be proprietary or standardized (FIG. 3). Conveying the necessary information does not require the definition of a new message, it can be added to existing ones as optional Information Elements (IE). For example, in LTE, the X2-AP Resource Status Update message can be used as a placeholder for an optional IE to periodically report FA status information from one FA to the peering FA. In case of a HO triggered freeze, the X2-AP SN Status Transfer message (which is part of the standard HO signalling) could be used to transfer the latest ZWA from the source eNB to the target eNB of the UE under handover as part of the standard HO signalling (in case multiple flows of the UE are subject to freeze, the ZWA for all respective flows has to be transmitted).

The reason for preferring the SN Status transfer to the initial Handover Request message is that the latter can still be rejected by the target eNB in case its admission control does not let the UE perform the handover, whereas the SN Status Transfer message is sent from the source eNB to the target eNB after the HO has been accepted. The FA procedures including the messages and the involved IEs are described below in detail.

For a given connection, the FA monitors (in order to detect or predict triggers) only that particular data that is relevant for the freeze actions allowed by the user profile. When a freeze trigger is detected, the FA sends the ZWA by reusing the ACK stored in the connection's register. When a defreeze trigger is detected, the FA sends the NZWA by reusing the ACK stored in the connection's register. In both cases, only the advertised window field of the stored ACK is altered before resending it. A valid alternative is to set the advertised window size within the NZWA to a value less than the one contained in the original ACK. This option is useful as it might happen that meanwhile the receiver status has changed and it is not able to handle the amount of data reported in the original ACK. The NZWA will restart the data flow, triggering new ACKs with the correct advertised window size once these packets arrive to the receiver. During the freeze state, new ACKs are forwarded with the advertised window set to zero.

Figure 4:
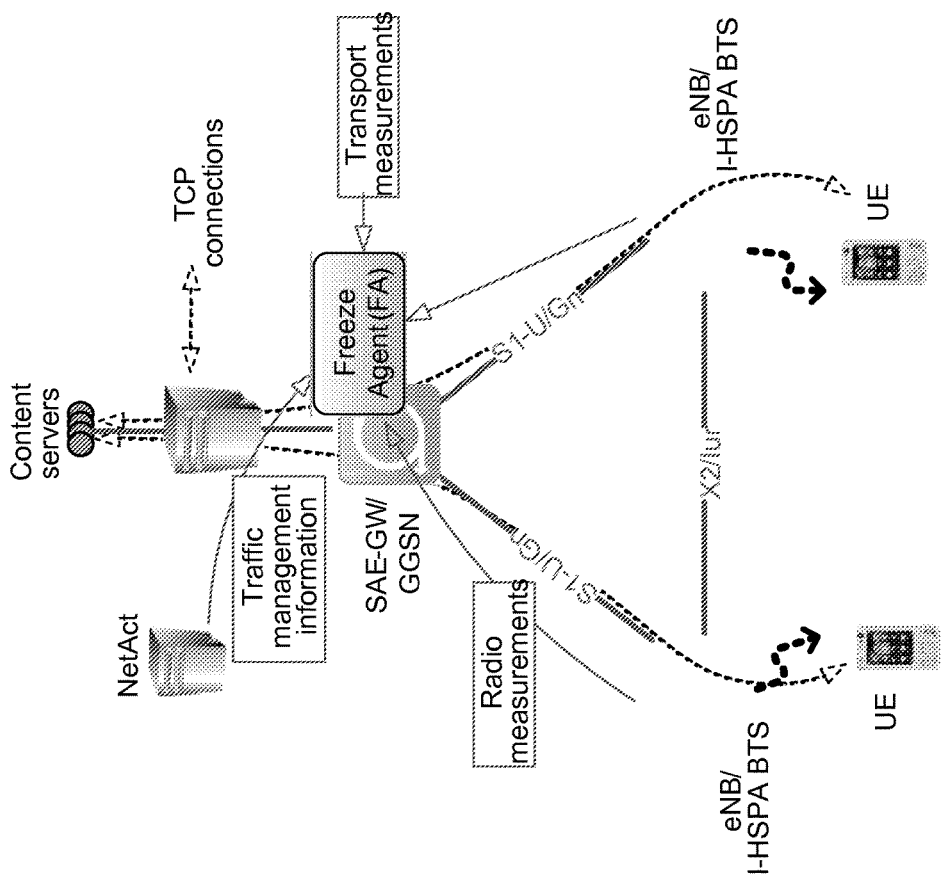
FIG. 4 is a diagram illustrating a system architecture is case of a SAE-GW/GGSN resident freeze agent according to an embodiment of the present invention.

Alternatively, the FA can be a software component running on or attached to a SAE-GW/I-HSPA GW (GGSN). This location enables the FA to handle each TCP based data flow of the users connected to the eNBs/I-HSPA BTSs served by the SAEGW/I-HSPA BTS. Alternatively, the number of flows handled by the FA can be limited to those that fit to the traffic management policies defined by the operator. However, depending on the events that are allowed to trigger TCP freeze, the FA might monitor the whole traffic mix as well. The central location of the FA provides benefits such as the possibility of being in full control in case of handovers, i.e., there is no need to communicate with a peering FA running on another radio access node. In turn, radio coverage problems can be handled by the FA only if the relevant measurements are collected from the eNBs/I-HSPA BTSs. Due to its central location, the transient transport network problems on the mobile backhaul and backbone that potentially would cause serious performance degradation or would require selective discard of low priority connections can be detected easier (FIG. 4).

Figure 5:
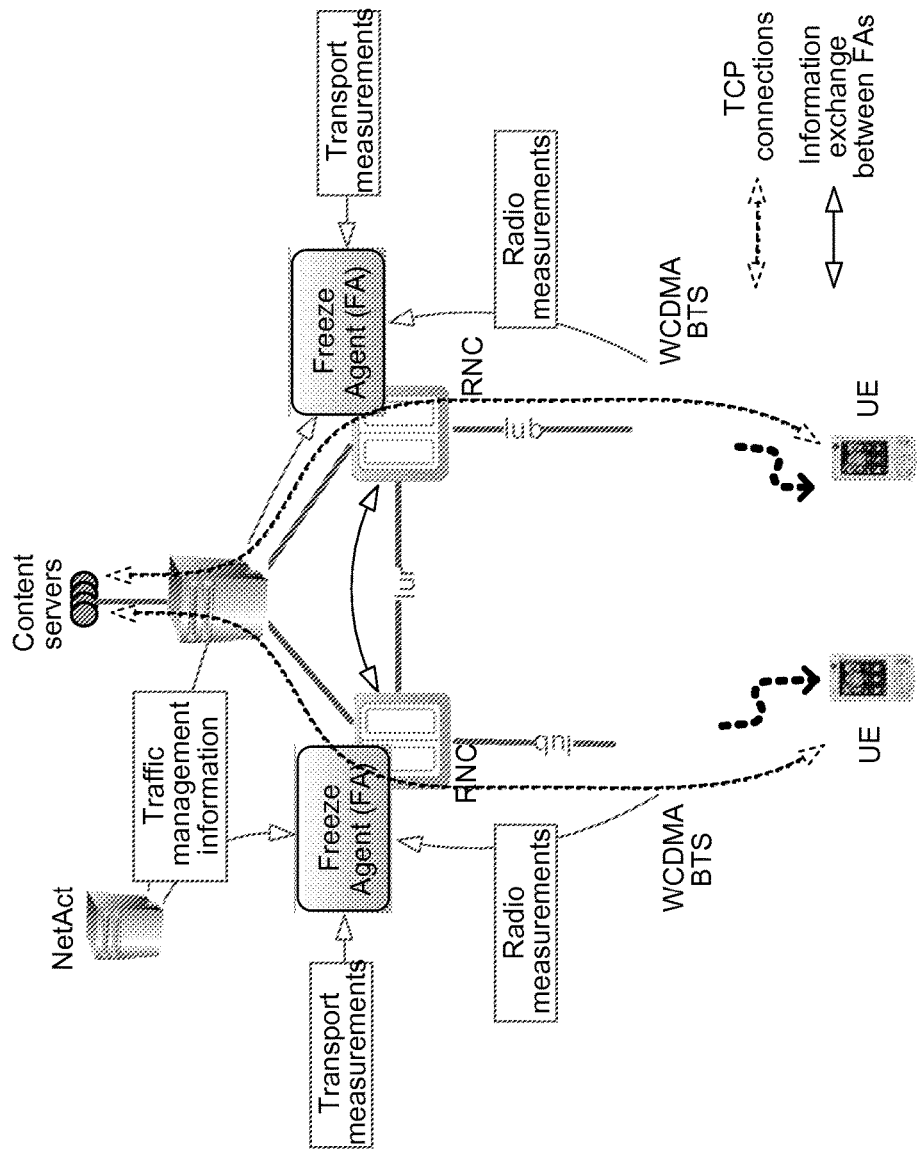
FIG. 5 is a diagram illustrating a system architecture is case of a RNC resident freeze agent according to an embodiment of the present invention.

In WCDMA/UMTS systems, the FA can be a software component running on or attached to an RNC. The RNC is the only feasible location of the FA as this is the network element where the radio layer 2 protocols are terminated, thus FA can have direct access to the TCP packets. The functionality and capabilities of the FA are similar to those described in case of LTE/I-HSPA systems. When FA is applied in order to improve the performance of HSDPA connections during RNC relocations, the solution should have the capability to exchange information between the involved RNCs (FIG. 5).

Figure 6:
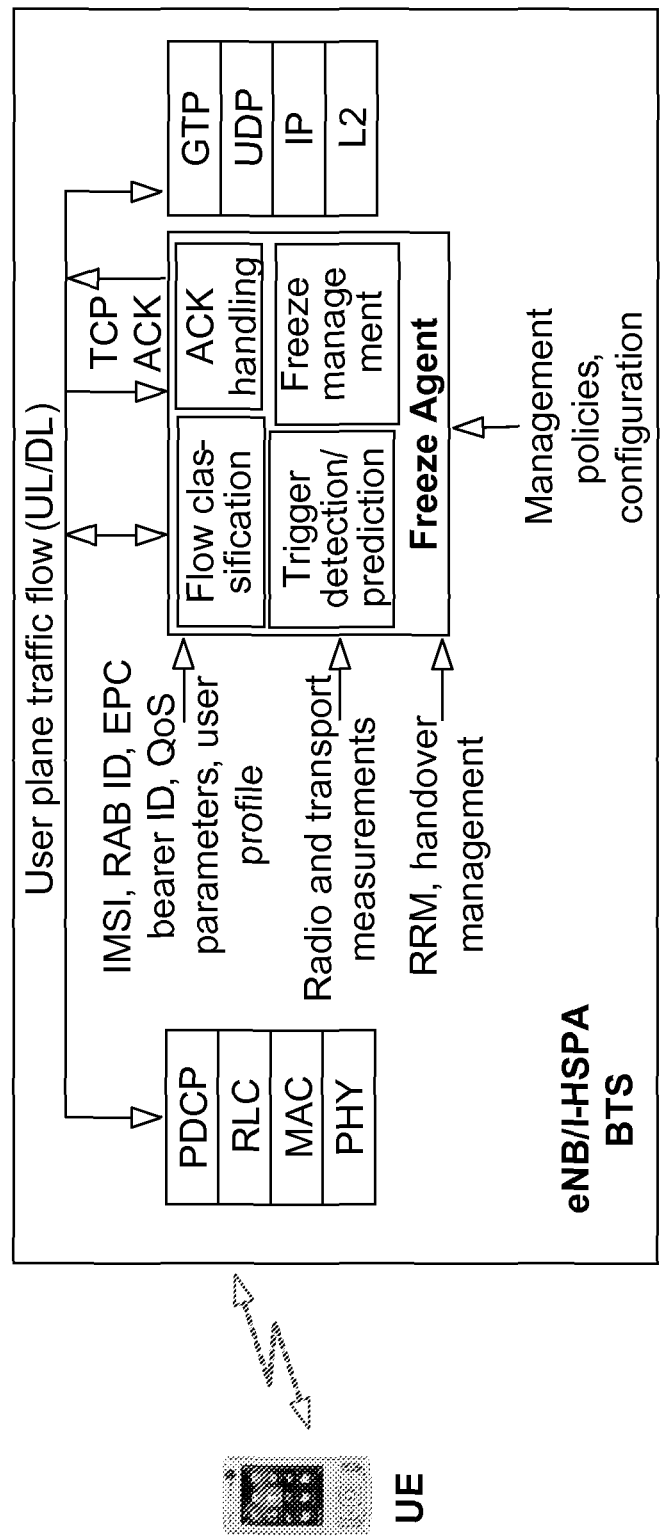
FIG. 6 is a diagram illustrating the architecture of a freeze agent according to an embodiment of the present invention.

The FA consists of four major entities: a flow classification entity, an ACK handling entity, a trigger detection and prediction entity and finally the freeze management entity (FIG. 6). Similar architecture is used in case of SAE-GW, SGSN or RNC located FAs. When a new connection is established, the flow classification entity identifies it based on the available IDs (IMSI, EPC bearer ID, RAB ID, PDP context, etc.) and checks whether it is using TCP for data transfer. In case yes, the freeze management entity checks the policy to be applied (based on the user profile, QoS parameters and configuration received from the MME, RRM and NetAct). In case the connection is to be managed by the FA, the status of the connection is set to normal by the freeze management entity (this status has only local meaning, i.e., the TCP source is not aware of it). The ACK handling entity creates a dedicated ACK register for the connection and starts to copy and store the last ACK into its ACK register of the connection.

Figure 7:
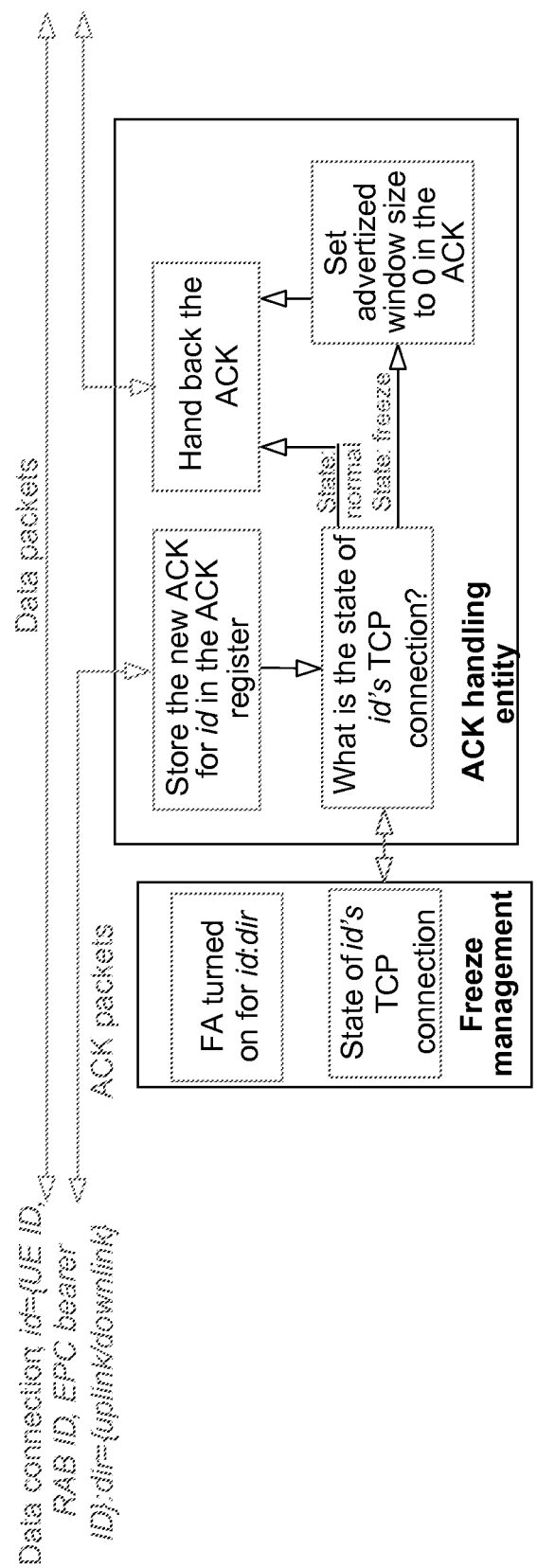
FIG. 7 is a diagram illustrating the operation of an ACK handling entity according to an embodiment of the present invention.

The ACKs of the TCP connections for which FA is turned on (the FA can be separately turned on in uplink and downlink direction for a connection) are handled by the ACK handling entity (FIG. 7). It is up to the operator's policy to specify for which direction of a connection the functionality is turned on/off. However, this has to be done in a consistent way, e.g., in case FA is activated for handover both of the involved eNBs/I-HSPA BTSs should support FA. In case the source eNB/I-HSPA BTS has the FA functionality turned on whereas the target has not, the freeze management entity should not take actions (i.e., it should not set the status of a connection to freeze) when the freeze trigger is detected. As a first action upon intercepting an ACK, the ACK is stored in the ACK register of the connection (the register contains only one ACK, the latest for a given connection). Next, the state of the connection is checked. In case the state is normal, the ACK is handed back, i.e., it is forwarded without further actions. In case the state is freeze, the new ACK is handed back for forwarding with the advertised window set to zero.

The stored ACKs are copied in order to create a fake ACK in case a related command is received from the freeze management entity. When the command is freeze, the ACK handling entity creates a fake ACK with ZWA using the content of the stored ACK. Alternatively, a wait timer could be started upon the reception of the freeze command instead of sending a ZWA at once based on the content of the stored ACK. If a new ACK is received before the wait timer expires, this new ACK is transformed into a ZWA. If no ACK is received until the wait timer expires then the latest stored ACK is used. In either case, the content of the ACK is not changed except for the advertized window size. When the command is defreeze, the ACK handling entity creates a copy of the stored ACK and sends it. A guard timer is implemented in the freeze management entity in order to handle the cases when the defreeze trigger is not detected in reasonable time. Upon the expiry of the timer, the freeze management entity sends a defreeze command with the indication to keep the original content of the ACK or to set the advertized window to a small value (it should be at least equal to the maximum segment size otherwise the TCP source is not allowed to send new data due to silly window syndrome avoidance). The latter option is more secure than the former as it prevents the overrun of the system with a burst of data at once. The circumstances at the receiver might change during freeze thus it might not be able to accommodate an amount of data specified in the stored ACK, therefore this option lets the receiver specify the actual advertised window size via an ACK sent as a response to a new data packet. Alternatively, the rate with which the data transfer is resumed can be reduced by sending triple ACKs with the same content that triggers fast retransmission and fast recovery at the source. During fast recovery, the rate of the source is reduced (halved) that is still better than having a slow start in case the FA is not applied.

Additionally, the FA should monitor the data packets in order to observe if the source has resumed the data transfer. In case there is no traffic, the ACK with NZWA is resent after a protection timer is over.

Figure 8:
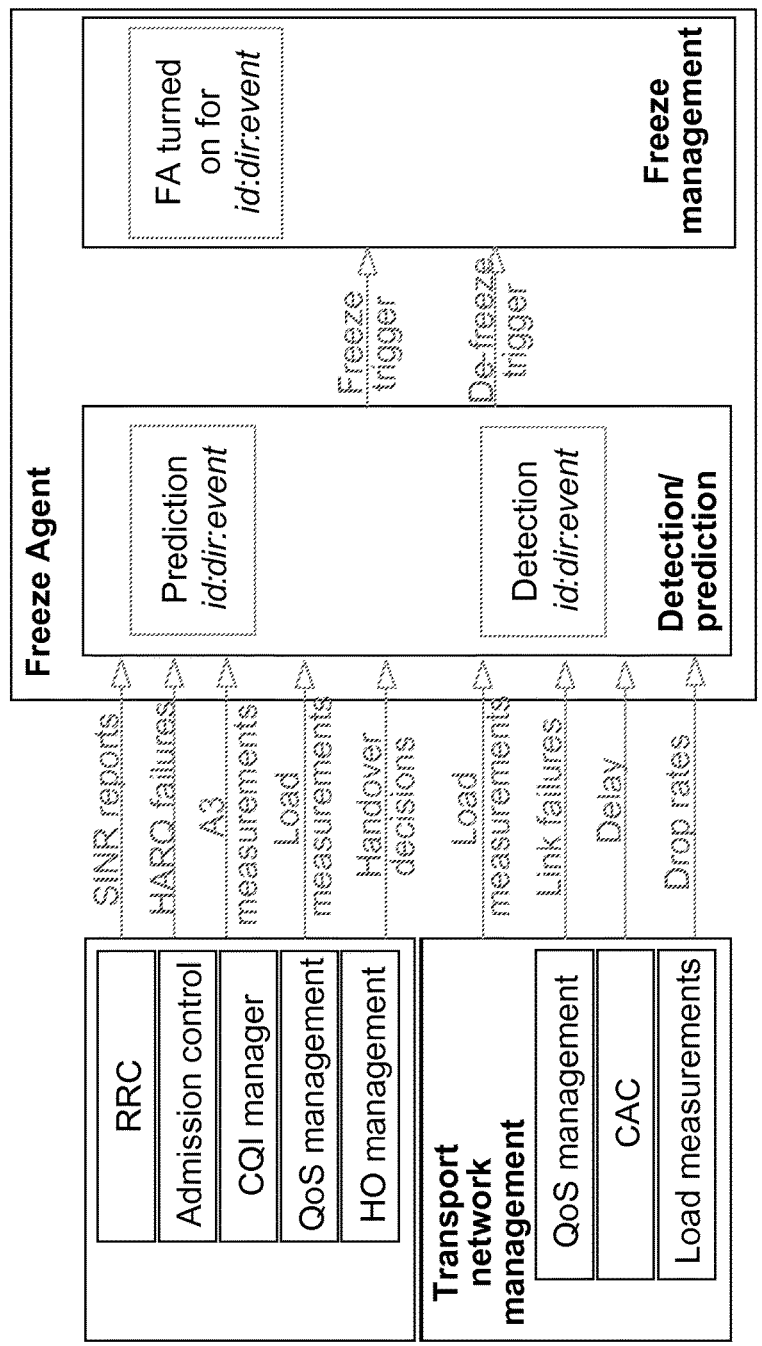
FIG. 8 is a diagram illustrating the operation of a detection/prediction entity according to an embodiment of the present invention.

The trigger detection/prediction entity collects data from the RRM and from the transport network management. The list of RRM measurements that can be collected includes but is not limited to the Signal to Interference plus Noise Ratio (SINR) measurements, HARQ failure reports, scheduling delays, air interface throughputs, air interface load measurements, HO decisions and A3 measurements (FIG. 8). In case the FA is located at the eNB/I-HSPA BTS, the measurements are available locally, thus only hardware or other platform specific constraints can limit the granularity and the frequency of the measurement reports, except for measurements reported by UEs, where the granularity is constrained by the maximum report periodicity allowed by the corresponding standard (for LTE, the RRC standard [36.331]). FA located in SAE-GW/GGSN or RNC can collect much less information about the air interface conditions, the granularity of the measured data, and the frequency of the measurement reports is limited by the capacity of the transport network and the latency in the prediction/detection mechanisms. RRM measurements can be used in order to detect or predict air interface degradation and to predict or detect handover decisions. Air interface degradation can be detected via predefined thresholds, that is, if a threshold is exceeded the detection mechanism would send a freeze or defreeze trigger.

A possible implementation could use an adaptive first-order irreducible Markov chain, where the number of states is pre-configured; states might represent E-DPDCH channel quality intervals e.g., SINR or Block Error Rate (BLER) intervals. Once measurements are available, the prediction algorithm starts to learn the channel proprieties by updating the state transition probabilities. Channel degradation or improvement can be predicted by applying prediction thresholds. The algorithm could correct itself in case of erroneous predictions. Handovers can be detected by communicating with the HO management (FA located in the eNB/I-HSPA BTS) or receiving the related handover command (FA located in the SAE-GW/GGSN) while a handover can be predicted from the radio measurements sent by the UE. Alternatively, a threshold stricter than the one defined by the A3 trigger could be used. Load information, scheduling delays and throughputs can be used when FA is used for prioritization of high priority connections over low priority ones.

Transport related measurements (delay, interface utilization, load, packet drops, congestion level, etc.) are collected either directly from the transport interface in case of point-to-point links or from the transport management entity (the definition of triggers on transport measurements is feasible only in case of direct interface to the transport links, otherwise these measurements and reports should be used only as aspects at decisions). The solution should use the available measurement methods (for example, the frame sequence number and delay reference time based measurements available over Iub) or well known techniques (such as single and double marked packets sent between the network elements, etc.) in order to detect the circumstances when FA triggers should be set.

The detection/prediction entity collects measurements only for flows that have the FA turned on.

The network operator can define arbitrary FA events; however, the most straightforward ones are the handover, radio condition degradation and short term prioritization of UEs. When the detection/prediction entity predicts or detects a FA event for a UE, it sends a freeze or defreeze trigger to the freeze management entity, which in turn looks up the appropriate action to be taken from the freeze event rule database. This database is created based on the defined operator policies, configuration data and user profile. The database is maintained by the freeze management entity.

Table 1 shows example records of the database. The database is continuously updated based on the RRC and HO management data, i.e., IMSIs are added/deleted from the database based on the connection/disconnection/handover of the UE at the BTS and RAB IDs are added/deleted based on the activation/deactivation of data RABs. If the FA is not enabled for an IMSI or RAB ID then it is either not included in the database or the appropriate action is set to No action. The actions to be taken in case of an event are set based on the operator's policy. For example, the TCP connection of a premium user may be set into freeze state in case of handover and radio coverage degradation rather than to drop the call but it is not set into freeze state due to short term prioritization. Freezing the connection of the premium user in such a way contributes to a higher QoS for the user. In similar way, a low priority connection might be set in freeze state rather than to drop it in order to make room for a high priority connection. This application of the freeze mechanism helps both the high and low priority users taking part in the action: the high priority user can get the bandwidth of the low priority user, while the low priority user still has a chance to resume the data transfer if the freezing period is not prolonged (as opposed to being entirely dropped). It is also possible to set different actions for a UE's different RAB IDs.

TABLE 1

Example records of the freeze event rule database

| UE ID (IMSI) | RAB ID | Event | Action |
|---|---|---|---|
| 216010006309563 | default | Handover | Freeze |
| | | Handover end | De-freeze |
| | | Radio coverage lost | No action |
| | | Radio coverage recovered | No action |
| | ... | | |
| | dedicated #1 | Handover | Freeze |
| | | Handover end | De-freeze |
| | | Radio coverage lost | Freeze |
| | | Radio coverage recovered | De-freeze |
| | ... | | |
| 216010009367581 | dedicated #2 | Short term prioritization | Freeze |
| | | Short term prioritization end | De-Freeze |
| | | ... | |

If the Freeze management entity does not find any record in the database for the detected [event, IMSI] pair or the corresponding entry is "no action" then the entity ignores the event. Otherwise, it issues a freeze/de-freeze command to the ACK handling entity.

Figure 9:
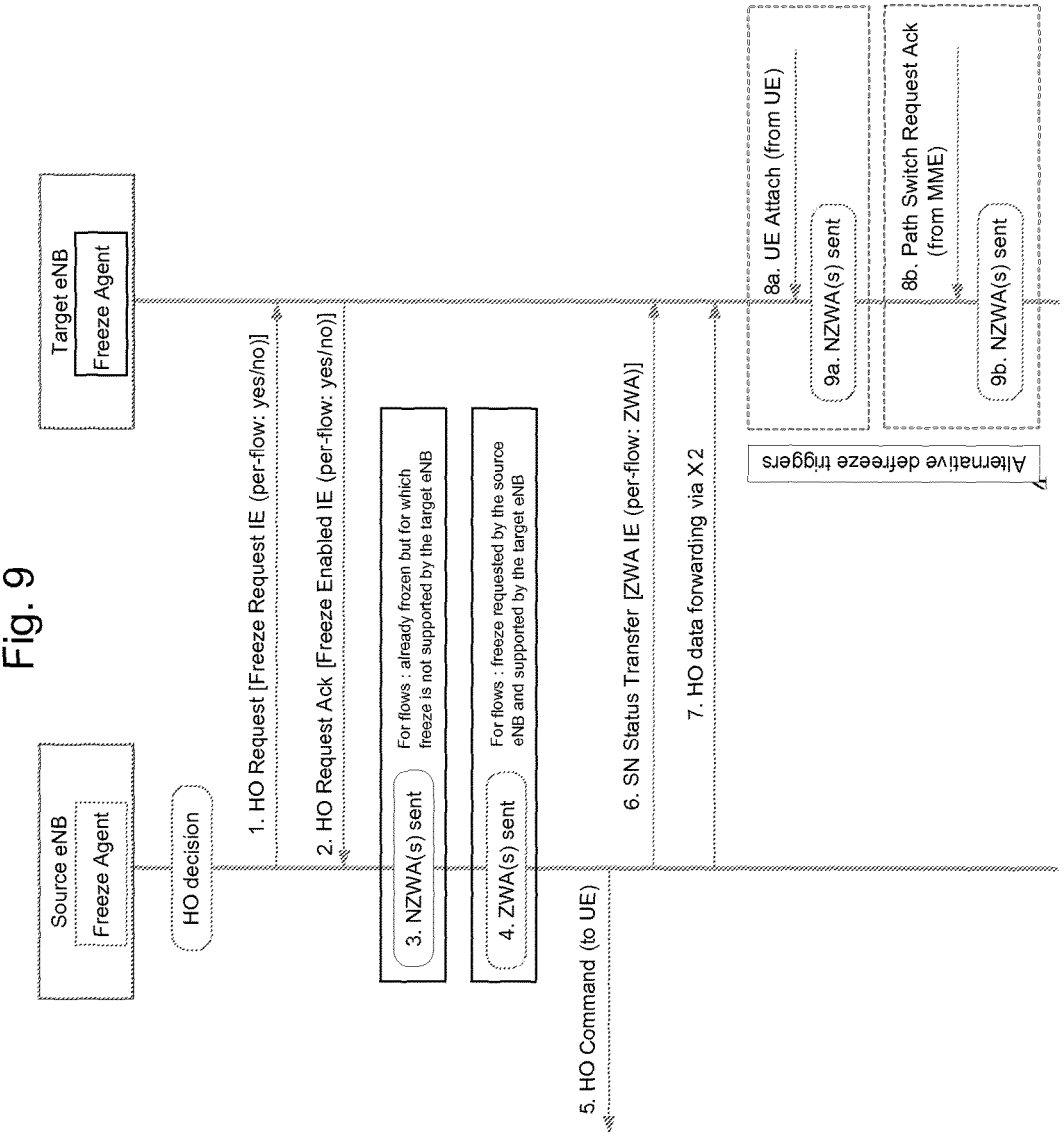
FIG. 9 is a flow chart illustrating inter freeze agent communication according to an embodiment of the present invention.

In case the FA is activated for handovers and the FAs are located at the eNBs, the FAs in the source and target eNBs should be able to exchange the data required for proper operation as the ZWA(s) are to be sent by the FA residing in the source eNB while the NZWA(s) are to be sent by the FA residing in the target eNB (FIG. 9). Thus, during the setup of a handover for a UE with required freeze action, the FA of the source eNB shall ask the FA in the target eNB if it supports FA functionality for the flows of the UE. The related information exchange can be implemented utilizing the standardized handover message sequence by defining new optional IEs for the messages: the Freeze Request IE, the Freeze Enabled IE and the ZWA IE. When sending the HO request X2 message (step 1), the source eNB fills in the optional Freeze Request IE for indicating which flows of the UE under HO require freeze action (e.g., by enumerating the corresponding flow IDs). The target eNB answers the request in the HO Request Ack message (step 2) by inserting the optional Freeze Enabled IE, which indicates for each flow ID in the Freeze Request IE whether the FA in the target eNB supports freeze action for that particular flow. This is required in order to ensure the consistent operation of the system even when the eNBs are configured with different FA options.

If one or more flows of the UE have already been frozen for any reason at the time when there is a HO decision for the UE (e.g., there was an earlier freeze trigger due to bad channel quality), the source eNB should defreeze all frozen flows of the UE for which freeze is not supported by the target eNB by sending the NZWA(s) for the corresponding flows after receiving the HO Request Ack message (step 3). In case the target eNB supports the freeze for the flows that are already in freeze state, the FA in the source eNB suspends the guard timer (to prevent triggering premature defreeze by guard timer expiry during HO) and omits step 4 (no additional ZWA needs to be sent for these already frozen flows).

After the set of the flows to be frozen have been settled (i.e., the flows that are not yet frozen and for which freeze action is supported by both the source and the target eNB), the source eNB freezes these flows (of the UE in handover) by sending the corresponding ZWA to each of them (step 4). Next, the source eNB sends the HO Command to the UE, which makes the UE detach from the source eNB (step 5). In case of UL data flow, the source eNB should not send the HO Command message to the UE until its HARQ process confirms the successful transmission of the (N)ZWA(s) to the UE in order to facilitate possible retransmissions on the air interface before the UE completely detaches from the source eNB.

After the HO command has been sent, the source eNB (more precisely, the FA entity attached to the source eNB) takes the following actions: in case of downlink data traffic, it transfers the ZWA(s) corresponding to the frozen flows of the UE to the target eNB by inserting them into the ZWA IE of the SN Status Transfer message (step 6); in case of uplink data flows, it forwards the ACKs received from the destination with ZWA to the target eNB according to the regular handover data forwarding procedure (step 7), thus there is no need to use the SN Status Transfer message. In either case, the target eNB will be able to defreeze the flows later (in step 9a or 9b) using the TCP sequence number in the transferred latest ZWA(s) when the NZWA(s) are created and sent to the TCP sources in the UE (UL data flow) or to the TCP sources (file servers, web servers, content servers) located on the core network or on the Internet (DL data flow).

As an optional optimization for intra-site HOs, the data exchange between FAs via inserting Information Elements in the above X2 messages may be omitted since there is only one eNB involved in the HO and the freeze and the defreeze actions are both handled by the same FA in this eNB.

Since in case of downlink data traffic it takes some time for the ZWA(s) sent by the FA to arrive at the TCP source, the TCP source may still send additional packets to the receiver in the mean time (i.e., after the FA has already sent the ZWA(s) to freeze the flows of the UE) as response to the acknowledgements sent by the receiver before the freeze trigger was detected (see also FIG. 2). In case these data packets arrive before the HO Command is sent to the UE, the TCP receiver in the UE would still send ACKs for these packets. These additional ACKs should be intercepted by the FA in the source eNB, converted to ZWAs and forwarded to the TCP source. Also, these additional ZWAs should be conveyed to the FA in the target eNB via the X2 interface as ZWA IEs embedded in subsequent SN Status Transfer messages. This will enable the FA in the target eNB to execute the defreeze via a NZWA (step 9a or 9b) with the latest acknowledged sequence number, improving the performance of the solution.

In case of uplink data traffic, the receiver located in the core network or on the Internet might still send ACKs as a response to the data packets sent by the source (UE) before it receives the ZWA. These ACKs are used to defreeze the TCP source after the successful UE attach in step 8a or the reception of the Path Switch Request Ack in step 8b. In the latter case, the ACKs with ZWA received from the source eNB will be transferred by the target eNB unchanged to the UE via the air until the Path Switch Request Ack is received. After the defreeze, the ACKs received from the source eNB with ZWA are forwarded with NZWA by the target eNB to the UE.

When the target eNB encounters the defreeze trigger (such as successful UE attach in step 8a or the reception of the Path Switch Request Ack in step 8b), the target eNB defreezes the flows of the UE by sending NZWA(s) (step 9*a* or 9*b*). NZWAs are also sent to flows that have already been frozen at the time of the HO decision; i.e., the completion of the HO acts as an ultimate defreeze trigger for all other triggers.

The optional Information Elements (Freeze Request IE, Freeze Enabled IE, ZWA IE) used for transferring data from the FA in the source eNB to the FA in the target eNB should be standardized in order to provide interoperability of the freeze action between eNBs in a multi-vendor environment. The standardization can be done in such a form that a legacy eNB not being aware of these IEs should ignore them upon receipt (neither send a response nor trigger an error procedure). An eNB that supports the freeze action should treat the lack of a response to a freeze related IE as a negative indication, i.e., as if the freeze was not enabled in the target eNB at all and act accordingly (cancel the freeze by sending the NZWA for the already frozen flows and do not send the ZWA IE).

Although the implementation of the freeze mechanism has been discussed by focusing on LTE, the implementation can be realized in an analogous way for I-HSPA or WCDMA/HSPA systems. The case of HO-triggered freeze has been discussed here in details as a specific example; the operation of the freeze mechanism due to other triggers (degraded channel quality, short-term prioritization, etc.) requires no communication between network nodes and they can easily be derived from this case.

If the TCP sender is in the UE (i.e., the TCP traffic is uplink from the UE's point of view), the operation of the FA is exactly the same as discussed previously, only the ZWAs and NZWAs are sent to the UE (in accordance with FIG. 2). If there is a HO for a UE with uplink TCP traffic, the FA in the source eNB acts the same way as in case of a UE with downlink TCP traffic. The only difference that makes the UL case somewhat easier is that the source eNB would never have to forward additional ZWA(s) to the target eNB in subsequent SN Status Transfer messages over X2, since these packets would be forwarded to the target eNB anyway as part of the standard X2 handover traffic forwarding. Sending the last ZWA to the target eNB in the SN Status Transfer message (step 6) is of course still expedient.

Figure 10:
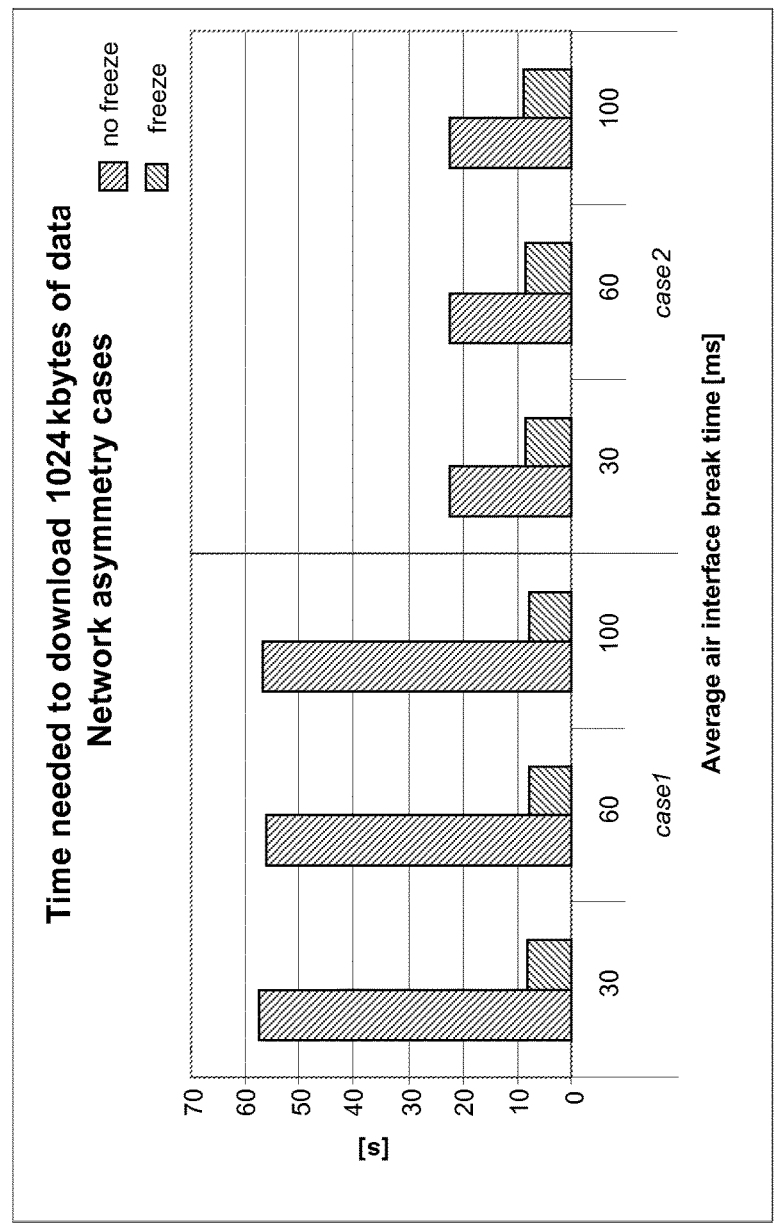
FIG. 10 is a diagram illustrating simulation results for network asymmetry cases according to an embodiment of the present invention.

The performance of the proposed FA functionality was evaluated with simulations in case of users executing file downloads with File Transfer Protocol (FTP). The results on the freeze triggered by LTE handovers show that the freeze can efficiently enhance the TCP performance in case of network asymmetry (i.e., when the UE has sufficient coverage in downlink but not in uplink). The measure used to evaluate the performance of the freeze functionality was the time required to download 1024 kbytes of data right after the handover command was sent. Two different traffic setups have been simulated, denoted by case1 and case2, with different number of users, each user having one active FTP connection during the simulation. There were 50 and 20 FTP users in case1 and case2, respectively, all of them subject to the freeze mechanism; additionally to the FTP users, there were 200 VoIP and 90 HTTP users that were not subject to the freezing mechanism. The users were uniformly distributed among 7 eNBs (1 cell per eNB) and were moving at speed of 3 km/h according to the random waypoint mobility model. In both case1 and case2, three time intervals (30, 60 and 100 ms) were simulated for the HO break time (i.e., the time between the UE detaching from the source eNB and attaching to the target eNB). FIG. 10 shows that the FA functionality significantly decreases the time needed to download 1024 kbytes of data by eliminating long idle times caused by the multiple timeouts. The gain is about 50 s in case1 and more than 10 s in case2; that gain in time considerably increases the QoE of the user and it can be enough to prevent to user from switching to another mobile network operator due to unsatisfactory services.

Figure 11:
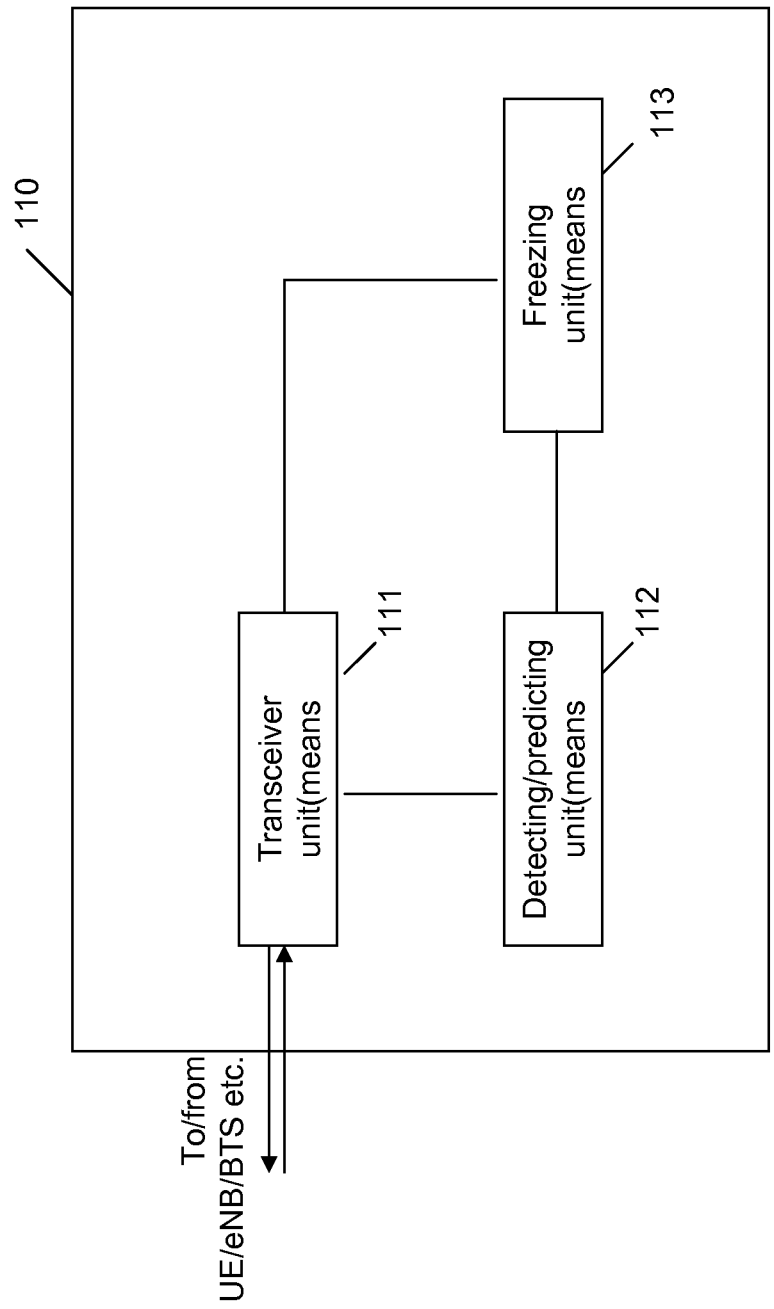
FIG. 11 is a diagram illustrating an example of an intermediate network node according to an embodiment of the present invention.

FIG. 11 is a diagram illustrating an example of an intermediate network node according to an embodiment of the present invention.

According to FIG. 11, the intermediate network node 110, which could be regarded as a freeze agent or includes a freeze agent, as described above, according to an embodiment of the present invention comprises a transceiver 111. The transceiver is capable of communicating, i.e. sending and receiving messages, with UEs, content servers or other base stations and the like. The transceiver 111 is further adapted to obtain quality measures of a connection between a content server, like e.g. a FTP server, and a user equipment. The freeze agent 110 further comprises a detecting/predicting unit 112 that detects and/or predicts whether the quality measure fulfils a predetermined condition or will fulfill the predetermined condition within an upcoming time period. The detecting/predicting unit 112 is connected to a freezing unit 113 that is capable of composing an acknowledgement message as a trigger for freezing the connection, e.g. a TCP connection between the content server and the user equipment, if the quality measure does not fulfill the predetermined condition. The acknowledgement message is sent via the transceiver 111 to the content server. Further, the detecting/predicting unit 112 detects, after the connection is frozen, whether the quality measure fulfils the predetermined condition again. If it is detected, that the predetermined condition is fulfilled, the freezing unit 113 causes the TCP connection to be resumed by sending another acknowledgement message triggering a defreeze mode of the connection via the transceiver 111.

The freeze agent may further comprise a timer (not shown), and when the timer lapses, the freezing unit may cause the TCP connection to be resumed via the transceiver 111.

It is noted that the connection between the content server and the user equipment may be a downlink for downloading content from the server to the user equipment or may be an uplink for uploading content from the user equipment to the server. Further, there may be a connection of the user equipment with another remote node for uploading content, like e.g. an email attachment or the like, from the user equipment to the remote node.

In the foregoing exemplary description of the freeze agent, only the units that are relevant for understanding the principles of the invention have been described using functional blocks. The freeze agent may comprise further units that are necessary for its respective operation. However, a description of these units is omitted in this specification. The arrangement of the functional blocks of the devices is not construed to limit the invention, and the functions may be performed by one block or further split into sub-blocks.

According to the present invention as described above, there is provided a solution that freezes the TCP connections whenever air interface coverage problems, transient air interface or transport congestions are detected or predicted, when a handover decision is made by the system or when prioritization of higher priority users over lower priority users is required in order to secure the right level of service. The TCP flows selected to be frozen are allowed to resume after the system sees the possibility of safe operation. This invention introduces a functionality located at the radio access nodes (eNB, I-HSPA BTS, SAE-GW, RNC) that follows the status (radio channel quality, transport congestion, handover, etc.) of the user plane connections, the overall load of a cell or any other relevant quality measure and freezes the selected TCP connections using regular ACK messages, i.e., the solution does not require the use of dedicated ICMP or other commands in order to freeze the TCP sources.

The following abbreviations are used in the above description:
3GPP 3$^{rd}$ Generation Partnership Project
ACK Acknowledgement
ARQ Automatic Repeat-reQuest
BER Bit Error Rate
BLER Block Error Rate
BTS Base Transceiver Station
E-DPDCH E-DCH Dedicated Physical Data Control Channel
eNB Evolved NodeB
EPC Evolved Packet Core
FA Freeze Agent
GGSN Gateway GPRS Support Node
GW Gateway
HARQ Hybrid ARQ
HO Handover
I-HSPA Internet—High Speed Packet Access
IE Information Element
IMSI International Mobile Subscriber Identity
LTE 3GPP Long Term Evolution Radio Network
NZWA Non Zero Window Advertisement
QCI Quality Class Indicator
QoE Quality of Experience
QoS Quality of Service
RAB Radio Access Bearer
RNC Radio Network Controller
RRC Radio Resource Control
RRM Radio Resource Management
SAE-GW System Architecture Evolution GW
SINR Signal to Interference and Noise Ratio
TCP Transmission Control Protocol
UE User Equipment
WCDMA Wideband Code Division Multiple Access
ZWA Zero Window Advertisement For the purpose of the present invention as described herein above, it should be noted that method steps likely to be implemented as software code portions and being run using a processor at a radio access node or user equipment (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (TransistorTransistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses and user equipments, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:
obtaining, by an intermediate network node of a connection between a content server and a user equipment, a quality measure of the connection between the content server and the user equipment;
detecting, by the intermediate network node, whether the quality measure fulfils a predetermined condition, wherein the detecting includes predicting, at the intermediate network node, whether the quality measure will fulfill the predetermined condition within an upcoming predetermined time period, based on the obtained quality measure;

based on the quality measure not fulfilling the predetermined condition, sending, by the intermediate network node, an acknowledgement message with 0 advertised window size triggering a freeze mode of the connection between the content server and the user equipment, wherein data packets in transit over the connection between the content server and the user equipment when the freeze mode is triggered can be processed during the freeze mode; and in the freeze mode, receiving from one of the user equipment and the content server, by the intermediate network node, a further acknowledgement message and sending the further acknowledgement message with modified content to another one of the user equipment and the content server, wherein the further acknowledgement message is sent by the intermediate network node on behalf of the one of the user equipment and the content server, and wherein the modified content comprises an advertised window set to zero.

2. The method according to claim 1, wherein
the connection between the content server and the user equipment is a downlink for downloading content from the server to the user equipment and the acknowledgment message triggering the freeze mode is sent to the content server.

3. The method according to claim 1, wherein
the connection between the content server and the user equipment is an uplink for uploading content from the user equipment to the server and the acknowledgment message triggering the freeze mode is sent to the user equipment.

4. The method according to claim 1, wherein the predicting is based on at least one of radio network measurements, transport network management information, traffic management information, and handover management information.

5. The method according to claim 1, further comprising
detecting, at the intermediate network node, after the connection is frozen, whether the quality measure fulfils the predetermined condition; and
if the quality measure fulfills the predetermined condition, sending another acknowledgement message to the content server or the user equipment triggering a defreeze mode of the connection.

6. The method according to claim 1, further comprising
sending another acknowledgement message to the content server or the user equipment triggering a defreeze mode of the connection after a lapse of a predetermined time period.

7. The method according to claim 1, wherein
the quality measure relates to radio channel quality, overall load of a cell, air interface coverage, transient air interface or transport congestions, or a handover decision or prioritization of higher priority users.

8. The method according to claim 1, wherein the connection is a transmission control protocol, TCP, connection.

9. The method according to claim 1, wherein the intermediate network node is a radio access node.

10. The method according to claim 1, wherein the acknowledgement message triggering the freeze mode is stored in a register of the intermediate network node, wherein the acknowledgement message stored in the register of the intermediate network node is replaced by the further acknowledgement message received from the one of the user equipment and the content server, and wherein the further acknowledgement message sent with the modified content on behalf of the one of the user equipment and the content server is using the further acknowledgement message stored in the register.

11. An apparatus, comprising:
at least one processor; and
at least one memory including computer program code, where the at least one memory and the computer program code are configured, with the at least one processor, to cause the apparatus to at least:
obtain, by the apparatus of a connection between a content server and a user equipment a quality measure of the connection between the content server and the user equipment;
detect, whether the quality measure fulfils a predetermined condition, wherein the detecting includes predicting whether the quality measure will fulfill the predetermined condition within an upcoming predetermined time period, based on the obtained quality measure;
compose, based on the quality measure not fulfilling the predetermined condition, an acknowledgement message with 0 advertised window size for triggering a freeze mode of the connection between the content server and the user equipment;
forward the acknowledgement message; and
in the freeze mode, receive from one of the user equipment and the content server a further acknowledgement message and send the further acknowledgement message with modified content to another one of the user equipment and the content server, wherein the further acknowledgement message is sent by the apparatus on behalf of the one of the user equipment and the content server, and wherein the modified content comprises an advertised window set to zero, and wherein data packets in transit over the connection between the content server and the user equipment when the freeze mode is triggered can be processed during the freeze mode.

12. The apparatus according to claim 11, wherein
the connection between the content server and the user equipment is a downlink for downloading content from the server to the user equipment and the acknowledgement message triggering the freeze mode is forwarded to the content server.

13. The apparatus according to claim 11, wherein
the connection between the content server and the user equipment is an uplink for uploading content from the user equipment to the server and the acknowledgement message triggering the freeze mode is forwarded to the user equipment.

14. The apparatus according to claim 11, wherein
the predicting is based on at least one of radio network measurements, transport network management information, traffic management information, and handover management information.

15. The apparatus according to claim 11, wherein
the at least one memory including the computer program code is configured with the at least one processor to cause the apparatus to:
detect, after the connection is frozen, whether the quality measure fulfils the predetermined condition; and
if the quality measure fulfills the predetermined condition, compose another acknowledgement message for triggering a defreeze mode of the connection.

16. The apparatus according to claim 11, wherein
the at least one memory including the computer program code is configured with the at least one processor to cause the apparatus to compose another acknowledgement message for triggering a defreeze mode of the connection after a lapse of a predetermined time period.

17. The apparatus according to claim 11, wherein
the quality measure relates to radio channel quality, overall load of a cell, air interface coverage, transient air interface or transport congestions, or a handover decision or prioritization of higher priority users.

18. The apparatus according to claim 11, wherein the connection is a transmission control protocol, TCP, connection.

19. A computer program product embodied on a non-transitory computer readable medium, the computer program product including a program for a processing device, comprising software code portions executed by a processor to perform:
   obtaining, with an intermediate network node of a connection between a content server and a user equipment, a quality measure of the connection between the content server and the user equipment;
   detecting, with the intermediate network node, whether the quality measure fulfils a predetermined condition, wherein the detecting includes predicting, with the intermediate network node, whether the quality measure will fulfill the predetermined condition within an upcoming predetermined time period, based on the obtained quality measure;
   based on the quality measure not fulfilling the predetermined condition, sending, with the intermediate network node, an acknowledgement message with 0 advertised window size triggering a freeze mode of the connection between the content server and the user equipment, wherein data packets in transit over the connection between the content server and the user equipment when the freeze mode is triggered can be processed during the freeze mode; and in the freeze mode, receiving from one of the user equipment and the content server, by the intermediate network node, a further acknowledgement message and sending the further acknowledgement message with modified content to another one of the user equipment and the content server, wherein the further acknowledgement message is sent by the intermediate network node on behalf of the one of the user equipment and the content server, and wherein the modified content comprises an advertised window set to zero.

20. The computer program product according to claim 19, wherein the program is directly loadable into an internal memory of the processing device.

21. The computer program product according to claim 19, wherein the processing device is a radio access node.

\* \* \* \* \*